Oct. 2, 1928.
A. E. BECKER
1,686,365
TESTING APPARATUS AND METHOD OF USING SAME
Filed March 21, 1921
2 Sheets-Sheet 1
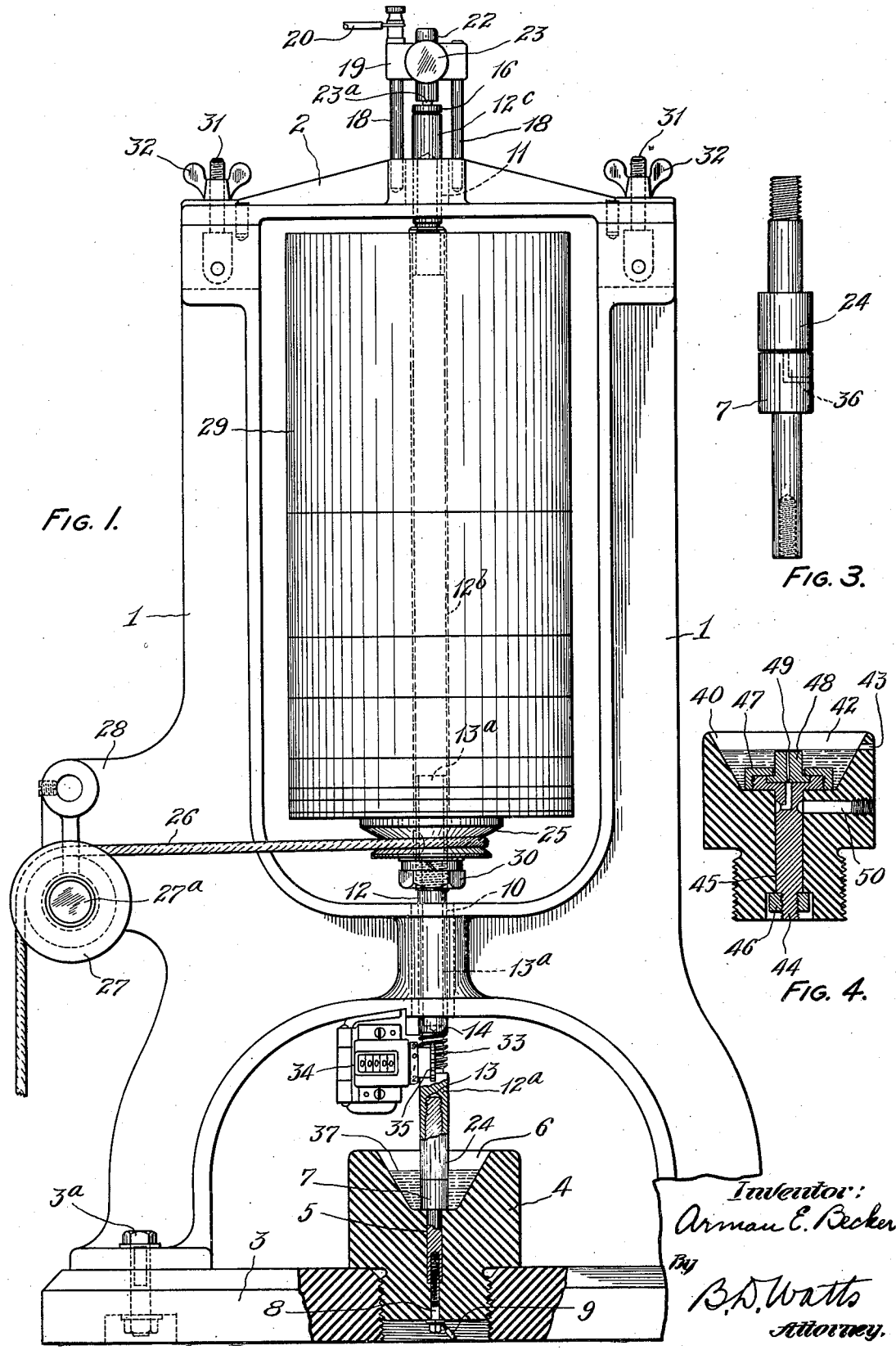

Oct. 2, 1928.
A. E. BECKER
1,686,365
TESTING APPARATUS AND METHOD OF USING SAME
Filed March 21, 1921        2 Sheets-Sheet 2
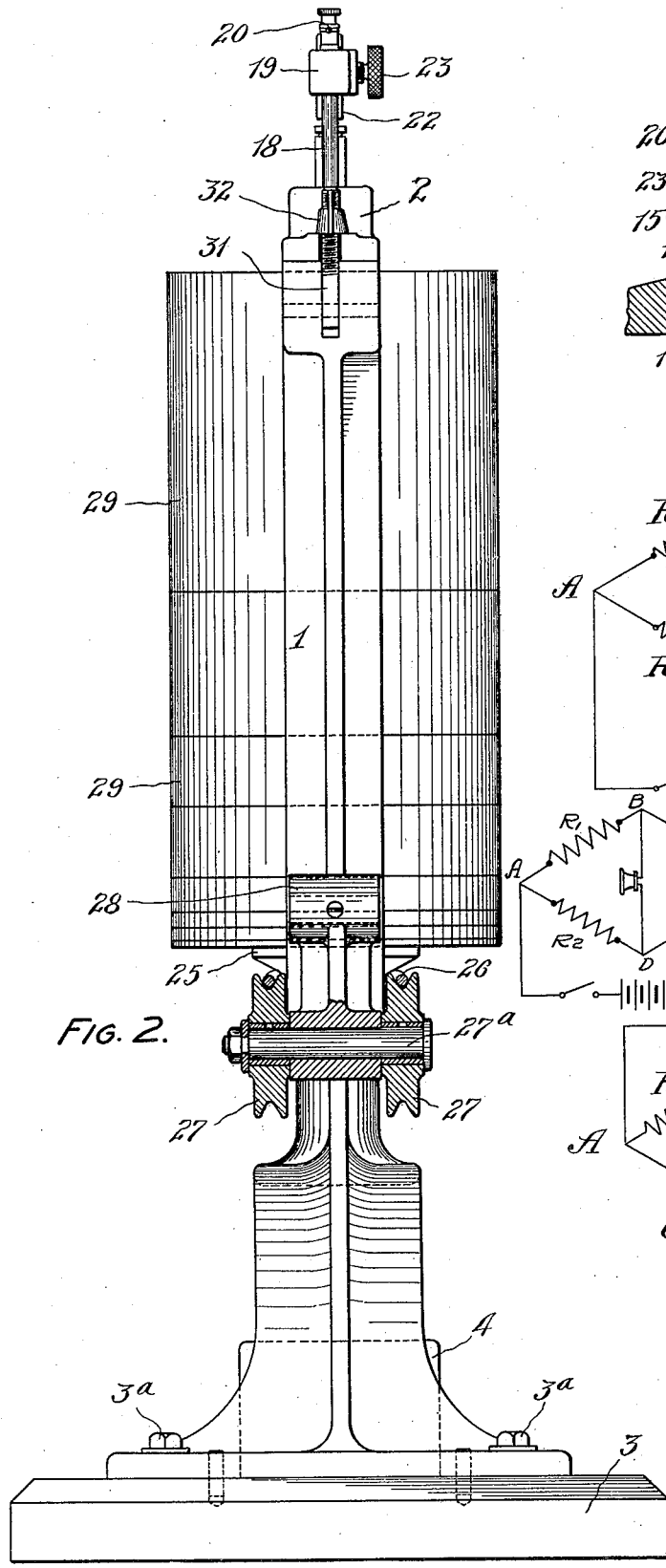
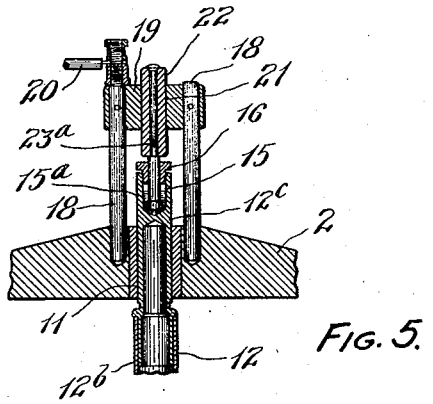
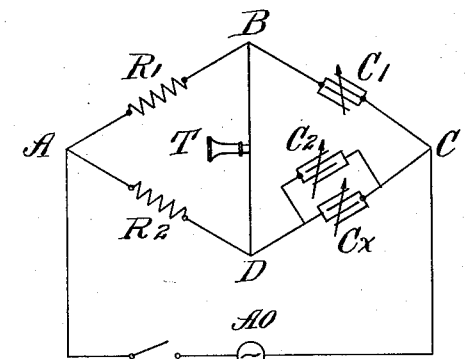
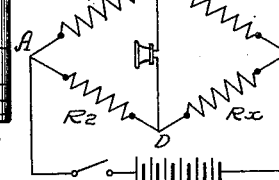
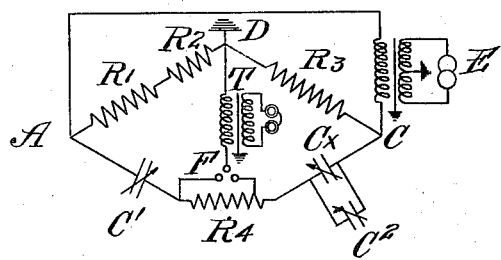
Inventor
Arman E. Becker
By B. D. Watts
Attorney.

Patented Oct. 2, 1928.

1,686,365

UNITED STATES PATENT OFFICE.

ARMAN E. BECKER, OF ELIZABETH, NEW JERSEY.

TESTING APPARATUS AND METHOD OF USING SAME.

Application filed March 21, 1921. Serial No. 454,281.

This invention relates to testing apparatus and to methods of utilizing the same. It is especially concerned with an apparatus for, and methods of determining the relative lubricating value of lubricants in bearings but it is also concerned with an apparatus for and method of determining the relative bearing qualities of bearing metals and compositions.

One object of the invention is to provide an apparatus for determining the relative lubricating value of lubricants for bearings.

Another object is to provide an apparatus for determining the relative bearing qualities of metals and compositions.

Another object is to devise a method and apparatus for measuring the thickness of a film of lubricant between two bearing surfaces.

Another object is to provide a method and apparatus for measuring the temperature of a film of lubricant between bearing surfaces.

Other objects more or less subordinate to these objects will appear in the following description of a practical embodiment of my invention, reference being had to the drawings attached to and forming a part of this specification, in which;

Figure 1 is a front elevation of my improved apparatus, parts being in section to show details of construction.

Figure 2 is a side elevation of the apparatus shown in Figure 1.

Figure 3 is an enlargement of the two test pieces, Figure 1.

Figure 4 is a sectional view of a modified form of oil cup, lower test piece and test piece mounting.

Figure 5 is a detail sectional view showing the parts comprising one electrical connection.

Figures 6, 7 and 8 are diagrammatic representations of the equipment and wirings employed in making determinations according to my invention.

In the drawings, 1 indicates an upright supporting frame, having a detachable head 2, both parts being formed preferably of cast iron, 3 indicates a base composed of electrically insulating material, such as bakelite, to which frame 1 is secured by bolts 3ª. Beneath the center of frame 1, a cup 4 which may consist of either metal or insulating material is mounted in a suitably threaded opening in base 3. An opening 5 extends vertically thru the cup 4 and communicates at its upper end with the enlarged cavity 6 in the top thereof.

A metallic test piece 7, composed of any desired bearing material, is secured in this opening 5 by a screw 8 to which an electrical conductor 9 is connected. The upper surface of test piece 7 is preferably plane and horizontally located. It may be of any desired size, but a plane surface approximately one half inch in diameter has been found sufficiently large for all purposes.

Directly above the cup 4 are vertically extending bores 10 and 11 in the frame 1 and head 2 within which openings a spindle 12 is mounted. This spindle, for the sake of lightness, is preferably composed of a plurality of sections $12^a$, $12^b$, and $12^c$. Section $12^a$, is formed from a solid rod by drilling out the ends, as indicated at 13 and $13^a$, the middle portion 14 of the rod remaining solid. This section $12^a$ is rotatably and longitudinally mounted in a bearing in opening 10. Section $12^b$ of the spindle is composed of a hollow tube having a close fit with section $12^a$ at the lower end and with section $12^c$ at the upper end. Section $12^c$ is formed from a solid rod by drilling out each end, as is clearly shown in Figure 5. The opening 15 at the upper end of section $12^c$ forms a well in which mercury or other electrically conducting liquid material may be confined by a nut 16, having threaded engagement with the end of the section. Section $12^c$ extends thru a bearing in the detachable head 2 of frame 1 for both rotational and longitudinal movement with respect thereto. The shaft 12 is thus freely movable either longitudinally or rotatably in frame 1.

Two upright posts 18 secured in head 2 are united by a cross piece 19. One post 18 is provided with a threaded upper end to which an electrical conductor 20 is secured. In a vertical opening 21 in cross piece 19 a block 22 is slidably mounted and secured in position by thumb screw 23; a continuation of this block or a separate rod $23^a$ attached thereto passes thru the opening in cap 16 and is immersed in the conducting fluid $15^a$ in the opening 15.

Within opening 13 at the lower end of spindle 12 a test piece 24 composed of any desired bearing material is mounted by having screw threaded engagement therein. The lower face of this test piece 24 should preferably correspond with the upper face of the test piece 7 in size and shoud be parallel thereto and in alignment therewith. Spindle 12 is rotated by a belt 26 which passes around a grooved pulley 25 keyed to the spindle and a live pulley, (not shown) which may be mounted on an electric motor, (not shown).

Provision has been made in post 28 to receive shaft 27ª on which pulleys 27 are mounted so that the source of motive power for spindle 21 may be located above the pulleys rather than below as is shown in the drawings.

In order that the force or thrust exerted by the test piece 24 on test piece 7 may be varied, balanced weights 29 of various sizes are provided, each weight being centrally bored to permit assembly with spindle 12 as is shown in Figure 1. The weights, when on the spindle are supported by pulley 25 and lock nut 30. In order that weights may be added to or removed from the spindle 12, the head 2 is detachably secured to the frame by eye bolts 31, to which wing nuts 32 are threaded. Release of the nuts permits the bolts 31 to swing clear of head 2 and after the thumb screw 23 has been loosened the head 2 with posts 18 and cross piece 19 may be lifted clear of the spindle thereby giving access to the shaft 12.

In order that the speed of rotation of the spindle and test piece may be determined, section 12ª of the spindle 12 carries a worm 33 on the solid portion 14 thereof. A revolution counter 34 attached to frame 1 is provided with a gear 35 adapted to mesh with worm 33. For convenience the counter 34 is pivotally secured to the frame 1 so that it may be moved into meshed position with worm 33 when and as desired.

In figure 3 the test pieces 7 and 24 are shown in enlargement. Test piece 7 has a duct 36 leading in toward the center from a side surface and then extending to the top surface thus forming an oil passage into the space between the plane surfaces of the two test pieces from the supply 37 in cavity 6 of cup 4.

A modified form of cup is shown in Figure 4. This cup 40 has an enlarged cavity 42 in its upper face with an overflow or withdrawal duct 43 in one side wall.

Member 44 is secured in opening 45 with a substantially oil tight fit by nut 46 the upper end of the member being enlarged and provided with threads on the periphery with which a shouldered nut 47 engages. A test piece 48 having a flange at its lower end is seated on the upper surface of member 44 and secured in position by the nut 47. A duct 49 passing lengthwise thru test piece 48 communicates with a duct in member 44 which leads to an opening 50 in the side of member 40 thru which a supply of oil may be forced to the upper plane surface of test piece 48.

An electrical conductor 9 may be attached to the lower end of member 44.

When conductors 9 and 20 are connected with a source of electrical current the path of the current between the conductors lies thru test piece 7, test piece 24, spindle 12, mercury 15ª and rod 23ª to post 18. If a layer or film of lubricant separates the test pieces, the current must pass thru it since test piece 7 is insulated from the frame by base 3. During rotation of spindle 12 good electrical contact between the spindle and rod 23ª is maintained by the mercury in cavity 15.

The operation of the apparatus is essentially the same for the determination of either the relative lubricating value of lubricants or the relative bearing qualities of bearing materials. In the former case, however, two or more lubricants are compared, the test pieces remaining the same while in the latter case the same lubricant is used with various combinations of test pieces.

The fundamental theory upon which these determinations are based is that the thickness of a film of lubricant in a bearing depends in part, first, upon the adhesive force existing between the lubricant and bearing surfaces and second, upon the viscosity of the lubricant. A measurement of the thickness of the film of lubricant in a bearing under various conditions of load, speed of rotation, etc., will therefore furnish an accurate indication of the relative lubricating value of a given lubricant. In a similar manner the bearing qualities of various metals may be compared and relative values obtained by measuring the thickness of film of lubricant existing under standard conditions.

In making determinations of film thickness with this apparatus the parts are assembled as indicated in the drawings, a quantity of oil, grease or other lubricant being supplied to the cavity 6 in cup 4; or a source of oil is connected to duct 50 when the modified form of cup 40 is employed. The weights 29 are usually omitted during the first part of the test, being added from time to time as the test progresses. The test apparatus is then connected by conductors 9 and 20 in the electrical circuit shown by either Figures 6 or 7. The rotation of spindle 12 sets up the formation of a layer or film of lubricant between the plane surfaces of the two test pieces due in part to capillary attraction and, in part, to the centrifugal force of the rotating test piece which throws the lubricant from the upper end of duct 36 to the periphery of the plane surface and causes the circulation of the lubricant thru the duct from the supply 37. The formation of a film between the test pieces will, however, not depend entirely upon the rotation of one of the members where forced feed, provided for in cup 40, is used.

Since the lubricant is a dielectric, a condenser is formed when the test pieces are separated by it, the thickness of the film being measurable in the following manner. The film having been formed between the test pieces, an alternating current of electricity set up by the audio oscillator AO is passed thru the Wheatstone bridge arrangement shown in Figure 6. The test apparatus which is designated as condenser $C_x$ together with an auxiliary condenser $C^2$ forms one arm DC of the bridge. Known resistances $R^1$ and $R^2$ and condenser $C^1$ of variable capacity form the other three arms AB, AD and BC respectively of the bridge. Upon adjusting the resistances $R^1$ and $R^2$ and capacity $C^2$ for a given test and varying the capacity of condenser $C^1$ until the potential at B is equal to that at D as indicated by the telephone receiver T, the capacity of the condenser $C_x$ may be calculated by substituting the known values in the following formula and solving for the unknown values.

$$C_x = \frac{R_1 C_1 - R_2 C_2}{R_2}$$

The value $C_x$ thus obtained may then be substituted in the following formula and the thickness of the film calculated, where $C_x$ is the electrical capacity, A the area of the bearing surfaces, K the dielectric constant $t$ the thickness of the oil film.

$$t = \frac{KA}{4\pi C_x}$$

If it is desirable to measure the resistance offered by the film to the passage of the current of electricity, a known variable resistance $R^3$ may be substituted for the condenser $C^1$, condenser $C^2$ being omitted, the film then being considered an unknown resistance $R_x$ instead of a condenser, a source of direct current F being employed as shown in Fig. 8. Since the electrical resistance varies directly with the thickness of the film, varying resistances will indicate varying thicknesses of film and will furnish comparative values of the lubricants tested.

Figure 7 shows a wiring diagram suitable for the detection of minute changes in resistance, and capacities. The audio oscillator E is connected with the points A and C of the bridge, in one branch ADC of which are placed resistances $R^1$, $R^2$, $R^3$ the branch being grounded at D as shown.

Known condensers $C^1$ and $C^2$ and the apparatus comprising the unknown condensers $C_x$ make up the other branch. Shields between the primary and secondary windings of the oscillator E and the telephone receiver T are provided to prevent errors by capacitance to earth. A switch F and a variable resistance $R^4$ makes possible the addition of resistance to either arm AF or CF of the bridge, and facilitate balancing of the current in the arm CF.

Values for the thickness of the film of lubricant between the test pieces are obtained when this wiring system is used by substituting the various values in the formula given above, as has been previously outlined.

From the foregoing disclosure it will be noted that I have provided an apparatus in which the relative values of lubricant or bearing materials for use in bearings may be determined and that the apparatus may be utilized with either direct or alternating current. Furthermore the method of determining the relative values of either lubricants or bearing materials may consist of measuring either the resistance offered by the film of lubricant to the passage of current or the capacity of the condenser composed of the bearing pieces and the film of lubricant, or both.

It is also to be noted that the temperature of the film of lubricant may be accurately determined by my invention. It has been found that the resistance reading of $R^4$, when the apparatus of Fig. 7 is being used, varies with the temperature of the oil film. From this fact it follows that if the exact relation existing between the resistance readings of $R^4$ and the temperatures of the film when such readings are taken, are known, the temperature of a film of given oil can be obtained at once. Accordingly when working with a given oil or lubricant, it is only necessary to determine by an auxiliary set of experiments, either with the apparatus of Fig. 7 or by separate means, the $R^4$ readings for the given oil at various known temperatures. Then when the oil is being tested with the apparatus of Fig. 7, the temperature of the oil during determination can be computed directly from the readings of $R^4$.

Altho I have for purposes of illustration described a form of apparatus embodying "thrust" bearings I do not wish to be understood as limiting myself thereto, since various forms of apparatus embodying rotating, conical or other bearings, as well as test pieces entirely insulated from the supporting frames are comprehended by my invention. The scope of my invention is defined by what is claimed.

What is claimed:

1. In an apparatus for testing lubricants and bearings the combination of a supporting frame, a vertical stationary member electrically insulated from the frame, having a plane upper surface and also having an electrical terminal, a vertical member rotatably mounted in the said frame in alignment with the stationary member, the said vertical member having a plane lower surface adjacent and parallel to the plane upper surface of the stationary member and also having an electrical terminal means for providing a film of lubricant between the said surfaces, connections from the said terminals to an electric circuit, and electrical means for determining the thickness of the said film.

2. In an apparatus for testing lubricants and bearings the combination of a supporting frame, a vertical stationary member electrically insulated from the frame and having a plane upper surface and also having an electrical terminal, a vertical member rotatably mounted in the said frame, the said rotating member being electrically connected to the said frame, and in alignment with the said stationary member and having a plane lower surface adjacent and parallel to the plane upper surface of the stationary member, means for providing a film of lubricant between the said surfaces comprising a duct in the stationary member communicating with the plane surface thereof and a supply of lubricant adapted to pass thru the said duct, connections from the said terminals to an electric circuit, and electrical means for determining the thickness of the said film.

3. In an apparatus for testing lubricants and bearings the combination of a supporting frame having an electrical terminal, a stationary member electrically insulated from the frame and having a plane horizontal upper surface and also having an electrical terminal, a vertical spindle rotatably mounted in the frame and electrically connected thereto, a member attached to the spindle in alignment with the stationary member having a plane lower surface adjacent and parallel to the plane surface of the said stationary member, means for providing a film of lubricant between the said surfaces, means for varying the force exerted on the said film by the said rotating member, means for rotating the spindle, connections from the said terminals to an electric circuit and electrical means for determining the thickness of the said film.

4. In an apparatus for testing lubricants and bearings the combination of a frame having an electrical terminal, a vertical spindle rotatably mounted in the frame and having an electrical connection with the said terminal comprising a cup shaped recess in the spindle, mercury in the recess and a metallic rod adjustably located in the said cup and secured to said terminal, a rotatable member having a plane lower surface connected to the said spindle, a stationary member insulated from the same and in alignment with the said rotatable member, the stationary member having a plane upper surface adjacent and parallel to the plane lower surface of the said rotatable member, means for providing a film of lubricant between the said surfaces, means for varying the force exerted on the said film by the said rotatable member, means for rotating the spindle and rotatable member, connections from the said terminals to an electric circuit, a source of electrical energy in the said circuit, and electrical means for determining the thickness of the said film.

5. In an apparatus for testing lubricants and bearings the combination of a frame having an electrical terminal, a cup insulated from the frame, a vertical stationary member mounted in the cup having a plane upper surface and an electrical terminal, a vertical member rotatably mounted in the said frame in alignment with the stationary member having a plane lower surface adjacent and parallel to the plane upper surface of the said stationary member, means for providing a film of lubricant between the said surfaces comprising a duct in the stationary member leading from a source of lubricant supply to the said surface, connections from the said terminals to an electric circuit, a source of electrical energy in the said circuit, and electrical means for determining the thickness of the said film.

6. In an apparatus for testing lubricants and bearings in combination a frame, a stationary member fixedly mounted therein, but electrically insulated therefrom, a movable member rotatably mounted therein and having a surface adjacent and conforming to a surface of the said stationary member, means for providing a film of lubricant between the said surfaces, means for varying the force exerted upon the said film and electrical means for determining the thickness of the said film.

7. In an apparatus for testing lubricants and bearings in combination a frame, a stationary member attached thereto, a member rotatably mounted in the frame and having a surface adjacent and conforming to a surface of the said stationary member, means for providing a film of lubricant between the said surfaces, means for varying the force exerted upon the said film, and means for determining the thickness of the said film including the passage of an electric current thru the said rotatable member, the film of lubricant and the stationary member, and also including means for measuring the electrical properties of the said film coincident with the passage of the said electric current therethrough.

8. A method of determining the relative lubricating value of lubricants for bearings and the relative bearing qualities of bearing compositions which comprises forming a film of lubricant between two parallel bearing surfaces, conducting a source of electrical current to each of the bearing surfaces and determining the electrical capacity of the condenser formed by the said film and the bearing surfaces, and calculating the thickness of the said film.

9. A method of determining the relative lubricating value of lubricants for bearings and the relative bearing qualities of metals and metallic compositions which comprises forming a film of lubricant between two parallel bearing surfaces, and measuring the electrical capacity of the condenser formed by the oil film and bearing surfaces, and calculating the thickness of the said film of lubricant.

10. In an apparatus for testing lubricants and bearings a combination of two aligned test members electrically insulated from each other and having adjacent parallel surfaces, a film of lubricant between and in contact with the said parallel surfaces and electrical means for measuring the capacity of the condenser formed by the two surfaces and the said film to determine the thickness of the film, said means including a source of electrical energy connected to the members, the said members and film constituting one arm of a Wheatstone capacitance bridge, other arms of which include variable known resistances.

11. In an apparatus for testing lubricant and bearings, the combination of two aligned relatively movable members electrically insulated from each other and having adjacent parallel surfaces, means for providing a film of lubricant between said members, and means for making electrical measurements to determine the electrical capacity of the condenser formed by said members and the film of oil, to calculate the thickness of said film.

12. In an apparatus for testing lubricants and bearings, the combination of a stationary test member, a rotatable test member electrically insulated therefrom and aligned therewith and having its surface adjacent and conforming to the surface of the stationary member, means for providing a film of lubricant between said surfaces, and means for making electrical measurements to determine the capacity of the condenser formed by said surfaces and the lubricant therebetween, to calculate the thickness of said film.

13. In an apparatus for testing lubricant and bearings, the combination of a stationary test member having a plane surface, a rotatable test member electrically insulated from and aligned with the stationary member and having a plane surface adjacent and parallel to said plane surface of the stationary member, means for providing a film of lubricant between the said surfaces, and electrical means for determining the electrical capacity of the condenser formed by said surfaces and film, to calculate the thickness of said film.

14. In an apparatus for testing lubricant and bearings, the combination of two aligned relatively movable test members, electrically insulated from each other and having adjacent parallel surfaces, means for providing a film of lubricant between and in contact with the said members, and electrical means for measuring the electrical capacity of the condenser formed by the said surfaces and film to determine the thickness of the film, said means including a source of electrical energy connected to said members.

15. In an apparatus for testing lubricant and bearings, the combination of two aligned relatively movable test members, electrically insulated from each other and having adjacent parallel surfaces, a film of lubricant between and in contact with said members, and electrical means for measuring the electrical capacity of the condenser formed by said members and said film to determine the thickness of the film, including a source of electrical energy connected to the members, the said members and film constituting one arm of a Wheatstone bridge.

In testimony whereof, I hereunto affix my signature.

ARMAN E. BECKER.